US009160746B2

(12) United States Patent
Adderly et al.

(10) Patent No.: US 9,160,746 B2
(45) Date of Patent: *Oct. 13, 2015

(54) AUTOMATIC PROVISIONING OF RESOURCES FOR MEETING COLLABORATION

(71) Applicant: International Business Machines Corporation, Armonk, NY (US)

(72) Inventors: Darryl M Adderly, Morrisville, NC (US); Christopher T Carlin, Holly Springs, NC (US); Michelle Davis, Raleigh, NC (US); Dale J Heeks, Cary, NC (US); Ryan E Smith, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/756,365

(22) Filed: Jan. 31, 2013

(65) Prior Publication Data

US 2013/0191891 A1    Jul. 25, 2013

Related U.S. Application Data

(63) Continuation of application No. 13/358,071, filed on Jan. 25, 2012.

(51) Int. Cl.
*H04L 29/06* (2006.01)
*H04W 12/06* (2009.01)
*H04L 12/18* (2006.01)

(52) U.S. Cl.
CPC ............ *H04L 63/10* (2013.01); *H04L 12/1818* (2013.01); *H04W 12/06* (2013.01)

(58) Field of Classification Search
CPC .... H04L 63/10; H04L 12/1818; H04W 12/06
USPC ....................................................... 726/2, 5–7
See application file for complete search history.

(56) References Cited

U.S. PATENT DOCUMENTS

| 6,560,637 B1 | 5/2003 | Dunlap et al. |
| 6,760,045 B1 | 7/2004 | Quinn et al. |
| 7,693,734 B2 | 4/2010 | Christenson et al. |

(Continued)

OTHER PUBLICATIONS

U.S. Appl. No. 13/358,071, Final Office Action, Sep. 13, 2013.

(Continued)

*Primary Examiner* — Joseph P Hirl
*Assistant Examiner* — Chi Nguy
(74) *Attorney, Agent, or Firm* — Kunzler Law Group; Damion Josephs

(57) ABSTRACT

A method may comprise maintaining by a computer system connected to a network an indication of availability dates and times of one or more output devices connected to the network. The computer system may receive an output device invitation indicating an output device to reserve for a meeting conducted over a conferencing system and determine whether the output device is available for reservation during a date and time period of the meeting. The computer system may be communicating over the network to the output device activation information indicating that the output device is to become active at a predetermined date and time related to the date and time period of the meeting and login information including a credential for the output device to use for logging into the conferencing system for the meeting.

18 Claims, 7 Drawing Sheets

(56) References Cited

U.S. PATENT DOCUMENTS

| | | |
|---|---|---|
| 2004/0064355 A1 | 4/2004 | Dorenbosch et al. |
| 2004/0103150 A1 | 5/2004 | Ogdon et al. |
| 2005/0246666 A1 | 11/2005 | Kalinoski et al. |
| 2007/0288291 A1 | 12/2007 | Earle |
| 2008/0183820 A1* | 7/2008 | Golovchinsky et al. ...... 709/205 |
| 2008/0239995 A1 | 10/2008 | Lee et al. |
| 2010/0100847 A1 | 4/2010 | Sato et al. |
| 2010/0165073 A1 | 7/2010 | Ishida |
| 2010/0246448 A1 | 9/2010 | Krantz et al. |
| 2011/0107236 A1 | 5/2011 | Sambhar |
| 2011/0271129 A1* | 11/2011 | Flannagan et al. ............ 713/323 |
| 2012/0278408 A1* | 11/2012 | Seferian et al. ............... 709/206 |
| 2012/0327175 A1 | 12/2012 | Couse |
| 2013/0058472 A1* | 3/2013 | de Jong .................... 379/202.01 |
| 2013/0127979 A1* | 5/2013 | Koh et al. .................. 348/14.08 |

OTHER PUBLICATIONS

Peter Mell et al., The NIST Definition of Cloud Computing (Draft), Recommendations of the National Institute of Standards and Technology, Jan. 2011, 7 pages.

Projector Networking, http://www.projectorpeople.com/resources/projector-networking.asp, Accessed as early as Sep. 15, 2011.

* cited by examiner

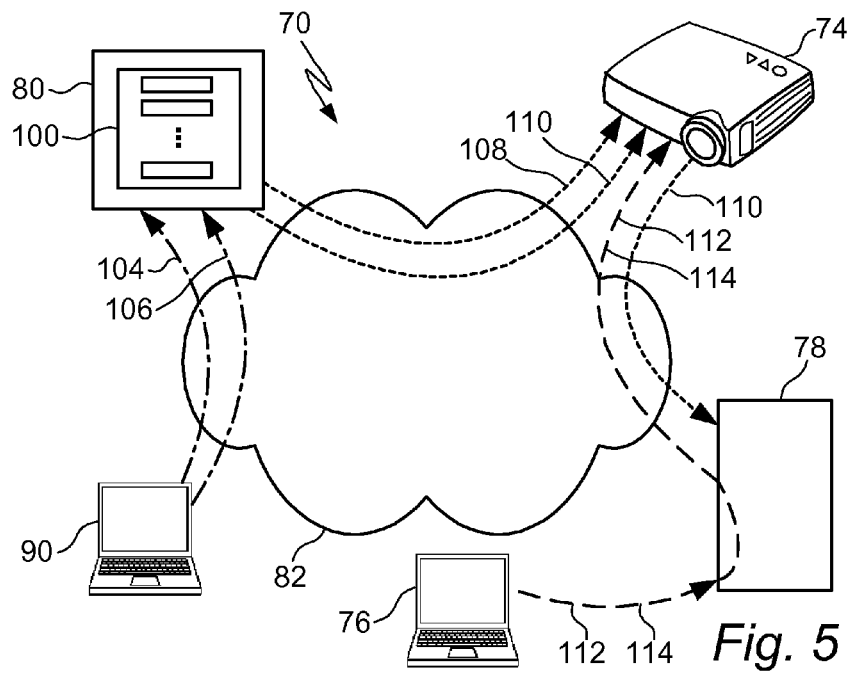
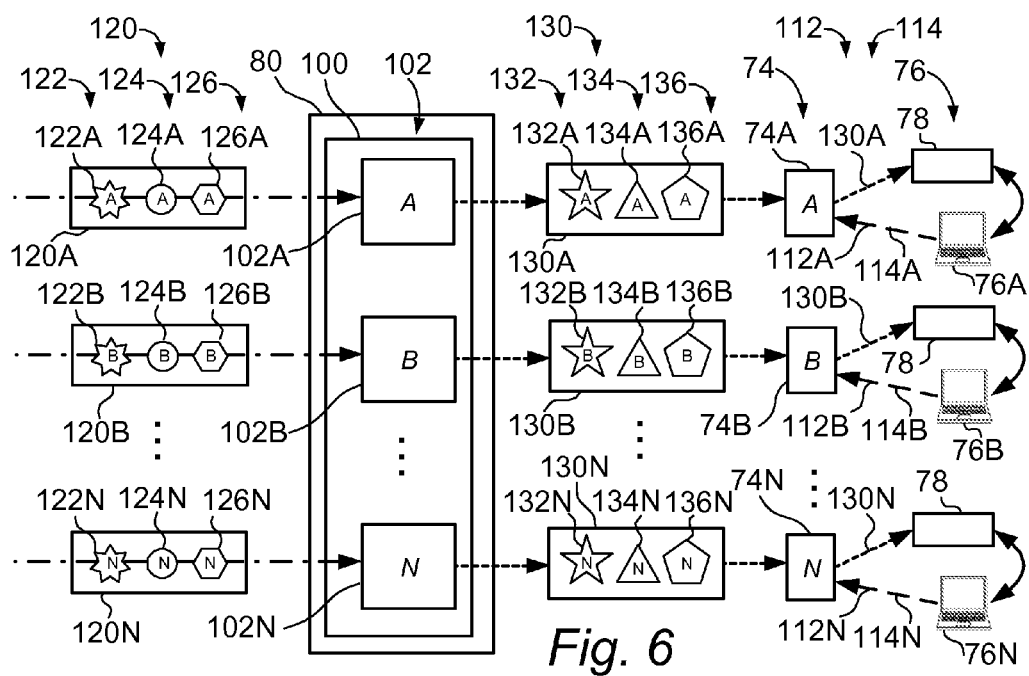

AUTOMATIC PROVISIONING OF RESOURCES FOR MEETING COLLABORATION

CROSS-REFERENCE TO RELATED APPLICATION

This application is a continuation of U.S. patent application Ser. No. 13/358,071, filed Jan. 25, 2012, which is incorporated herein by reference in its entirety for all purposes.

BACKGROUND

Embodiments of the inventive subject matter generally relate to the field of resources used for meetings, and more particularly to controlling access to resources.

Meetings, conferences, and similar events occur in meeting space shared by presenters and attendees. The space may provide one or more resources such as audio/video equipment provided to support the meeting. For example, a presenter may use a projector to show a presentation such as an electronic slideshow to attendees at an event such as a business meeting, academic conference, or commercial trade show. A series of presenters often share a resource such as a projector during a meeting.

BRIEF SUMMARY

One or more embodiments of the present invention may include methods for provisioning resources. According to an embodiment of the present invention, a method may comprise maintaining by a computer system connected to a network an indication of availability dates and times of one or more output devices connected to the network. The computer system may receive an output device invitation indicating an output device to reserve for a meeting conducted over a conferencing system and determine whether the output device is available for reservation during a date and time period of the meeting. The computer system may be communicating over the network to the output device activation information indicating that the output device is to become active at a predetermined date and time related to the date and time period of the meeting and login information including a credential for the output device to use for logging into the conferencing system for the meeting.

According to an embodiment of the present invention, a method may comprise receiving by an output device activation time information that includes an activation time for the output device and login information that includes a uniform resource locator (URL) and credential information for a web-enabled computer system networked to the output device and a login time. The output device may be activated at the activation time by the output device automatically powering up at the activation time. The computer system may be communicating with the output device by the output device accessing the URL of the computer system. The output device may be logging into the computer system by an output device transmitting the credential information to the computer system at the login time, and may be receiving content from the computer system.

BRIEF DESCRIPTION OF THE SEVERAL VIEWS OF THE DRAWINGS

FIG. 5 shows an example of messages and/or signals passed between portions of a resource provisioning system according to an embodiment of the present invention.

FIG. 6 shows an example of messages and/or signals passed to or from a resource provisioning system according to an embodiment of the present invention.

DETAILED DESCRIPTION

Figure 1:
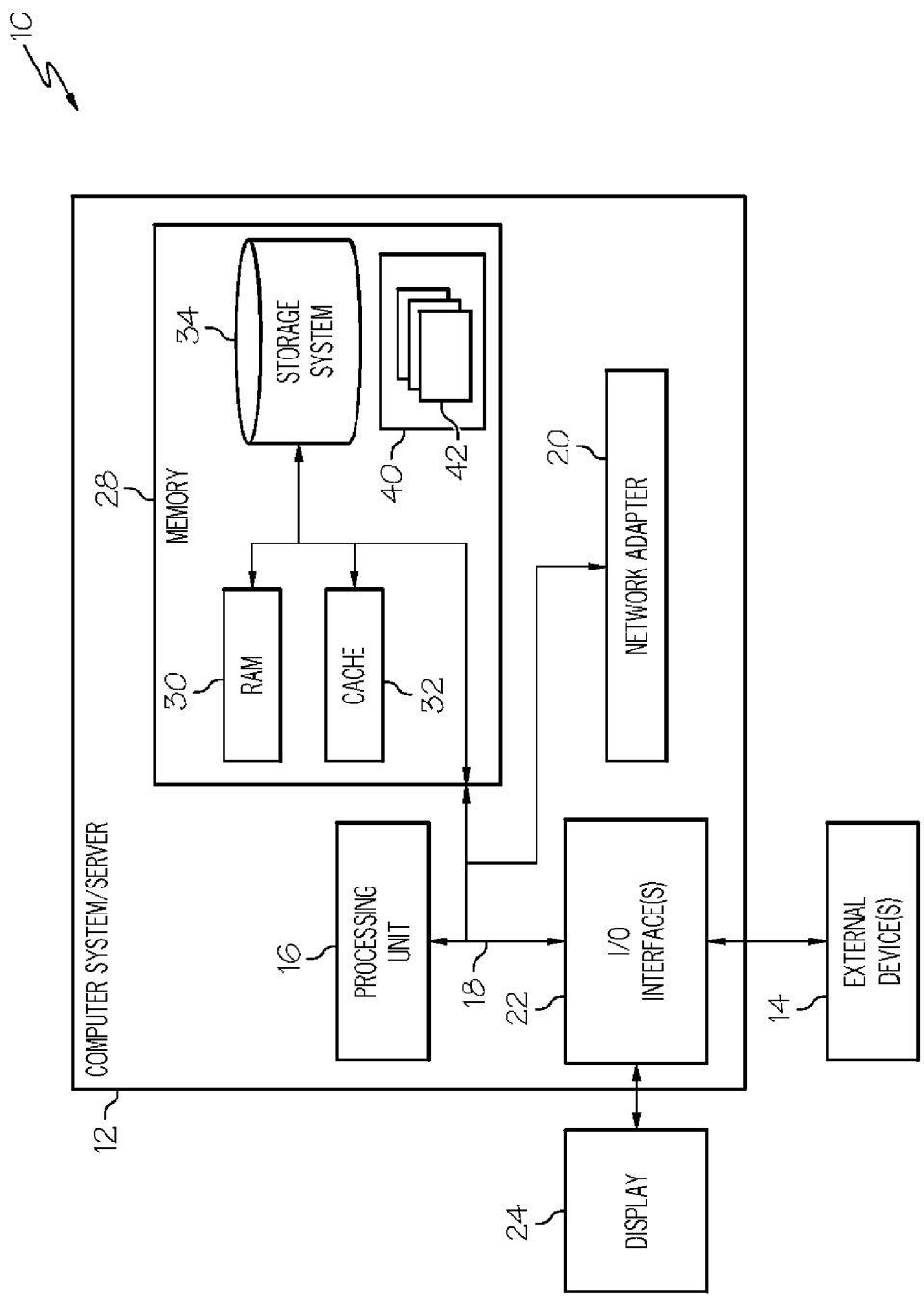
FIG. 1 depicts a cloud computing node according to an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention may be implemented in conjunction with any other type of computing environment now known or later developed, including a distributed environment like clusters of nodes in a network wherein a node represents an independently operating system.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Program modules 42 may be stored in a kernel of the operating system.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
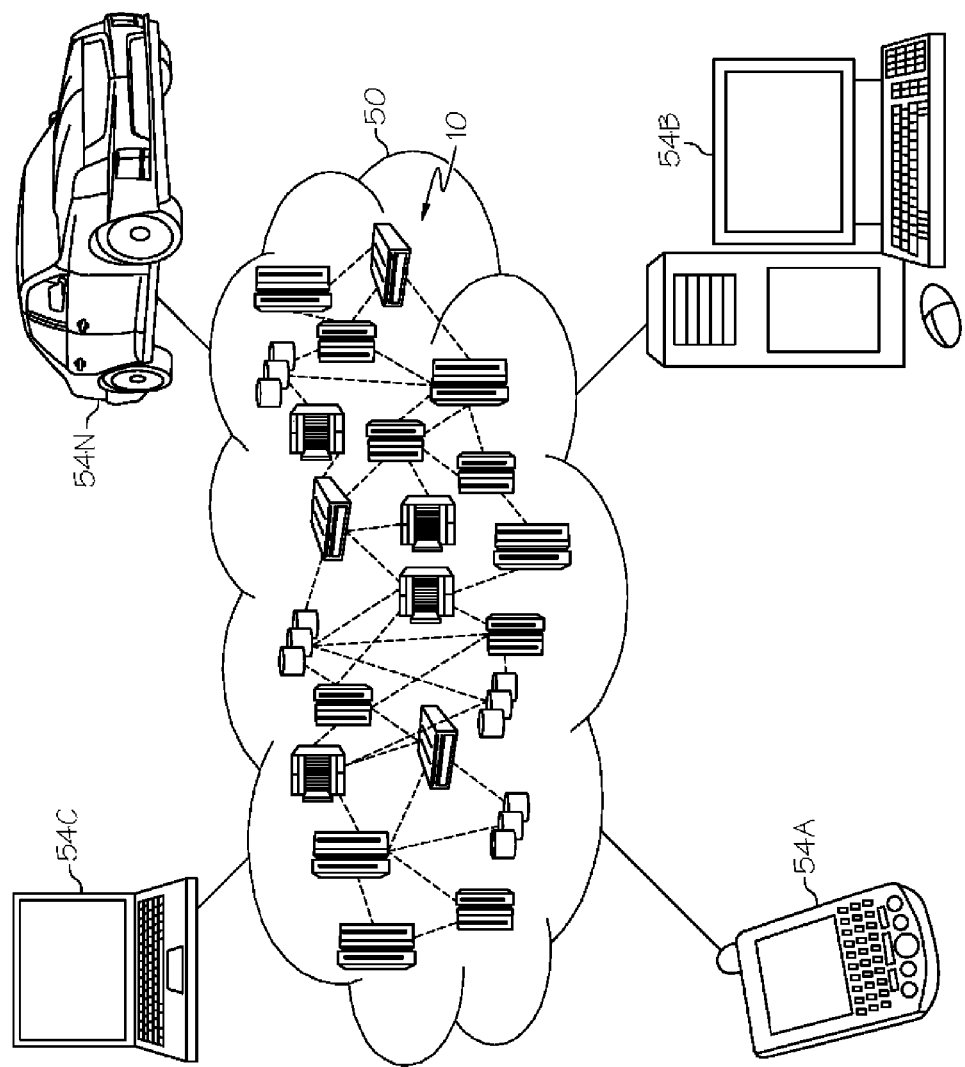
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). In FIG. 2 and elsewhere, the "A-N" notation may indicate an indefinite range, where "A" refers to a first item and "N" refers to a second, third, or subsequent item.

Figure 3:
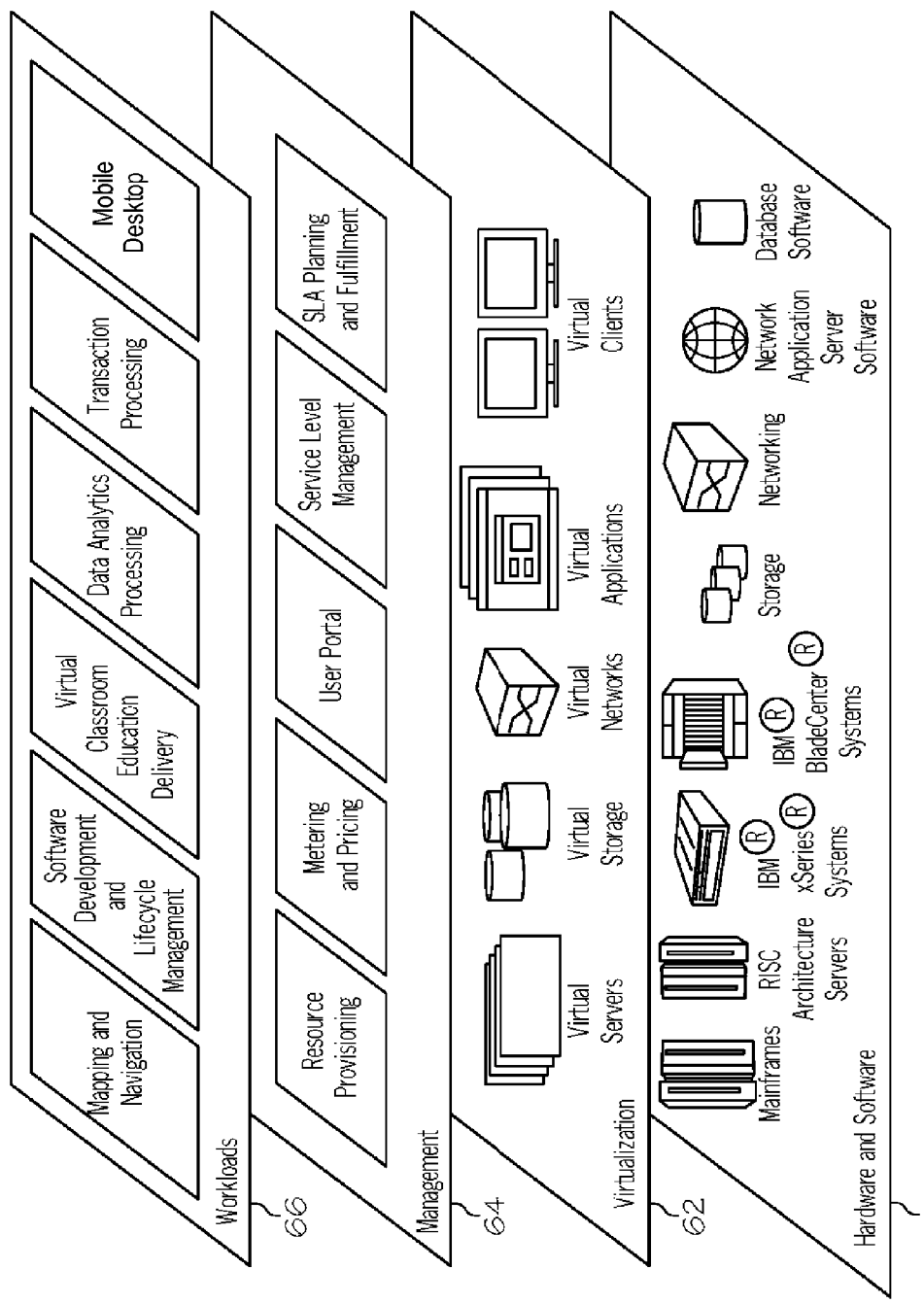
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification, such as login access, for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted above, systems, methods, and computer program products are disclosed herein for resource provisioning, such as scheduling and providing access to output devices such as digital projectors.

Figure 4:
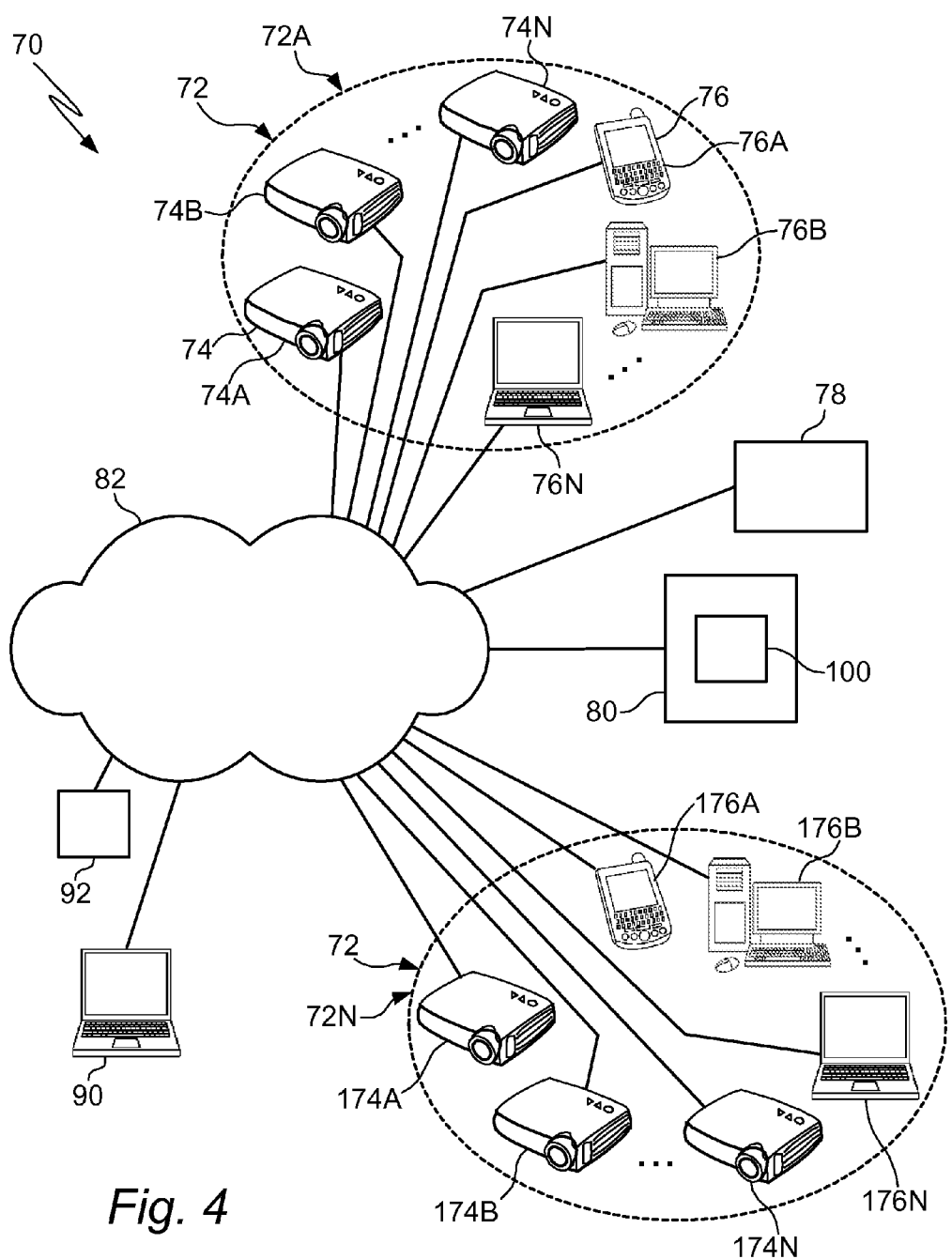
FIG. 4 shows an example of a resource provisioning system according to an embodiment of the present invention.

Referring now also to FIG. 4, a resource provisioning system, indicated generally at 70, may comprise at least one meeting 72 that includes at least one output device 74 and that may include at least one meeting client device 76; at least one conferencing system 78; at least one computer system 80, also referred to as a scheduler 80; and at least one network 82 to enable communication among the devices of system 70, with networked devices such as external client devices 90, and with external services such as email system 92. Resource provisioning system 70 may be an example of a cloud computing environment 50; output devices 74, meeting client devices 76, and external client devices 90 may be examples of cloud computing nodes 10 and/or computer/server systems 12 and may be examples of local computing devices 54A, 54B, 54C; network 82 may be an example of a LAN, WAN, or other public or private communications network; and scheduler 80 may be an example of a cloud computing node 10 and/or may be an example of a computer system/server 12.

A meeting 72 is a group event conducted in a physical and/or virtual space. Examples of meetings include conferences, presentations, teleconferences, videoconferences, seminars, webinars, trade-shows, business meetings, employee forums, training sessions, online games, distance learning, and other group activities. A meeting 72 may feature one or more presentations that convey information to attendees. For example, an attendee (a presenter) may display a slide show to other attendees (participants), for example, by using electronic presentation software running on a client device 76 such as a laptop computer and directly or indirectly connected to an output device 74 such as a digital projector. A meeting 72 may be held in a physical or virtual conference room designated as a facility for meetings, equipped with suitable output devices 74, and provided with access to a network 82 to enable electronic communication among client devices 76 and output devices 74, for example.

A meeting 72 may occur in multiple locations, each with its own facilities. FIG. 4 accordingly shows a first location 72A of meeting 72 equipped with one or more output devices 74A-N and a second or subsequent location 72N of meeting 72 equipped with one or more output devices 174A-N. Locations 72A-N may each provide connections to network 82. It is understood that a meeting may occur in more than two locations, and that each location may host an indefinite number of output devices and/or an indefinite number of meeting client devices.

A location 72A, 72N of meeting 72 may be a virtual location implemented in, for example, computer software and attended electronically via a telephone network, computer network, or both. For example, multiple attendees may conduct a meeting in a shared virtual location accessed through, for example, web conference, teleconference, or telepresence technologies. A meeting may employ both physical and virtual delivery technologies at the same time, so that a meeting 72 may include both in-person and on-line attendees.

An output device 74 may be a device or service associated with meeting 72 for use by participants. For example, a meeting 72 may offer a digital projector so that one or more presenters can display images, slideshows, and the like to attendees. An output device 74 accordingly may be a common or shared device or service. For example, if a meeting has a series of presenters, each showing a distinct slideshow, then the series of presenters may take turns using a shared projector. Other examples of a device 74 may include flat-panel, CRT, or other video display or projection devices; analog or digital audio or video playback systems; film projectors; digital whiteboards; public-address systems; telephones; conference-call systems; and access to wired and/or wireless computer and/or telephone networks. A device 74 may be a network-enabled device, allowing it to send (and/or receive) data to (from) other devices and/or services via network 82. A network-enabled projector, for example, may be able to display a slideshow sent to it via network 82 from a meeting client 76 (e.g., 76A, 78B, 176A, 176B, 176N) or from an external client 90. An output device 74 may be subject to access controls such as a password-protection system controlling access to its host network 82, for example.

As shown in FIG. 4, a meeting location may provide multiple output devices, indicated as 74A-N in location 72A and as 174A-N in location 72N, where the "A-N" notation indicates an indefinite number of one or more devices. For example, a location may provide more than one projector; or a location may provide a projector, a whiteboard, and a conference-call system; or any other combination of output devices 74 (e.g., 74A, 74B, 74N, 174A, 174B, 174N) appropriate to meetings held in location 72A, 72N.

As mentioned, a series of presenters may take turns using an output device 74 during the course of a meeting. Some output devices, however, are not immediately useful when first turned on, for example, due to a boot-up and/or warm-up time. A presenter may not expect this delay, forcing participants to wait until device 74 becomes useful. Some output devices 74 may employ a physical connection to a client device 76 used in conjunction with the output device 74. For example, a projector may employ a particular type of cable to obtain signals from a client device 76 before the projector can display an image from the computer device to attendees. Presenters often maintain slideshows or other presentations on their own client devices 76. If each presenter uses a unique device, then each presenter may connect that device to the projector at the start of each presentation. These transitions often cause delays during meetings. For example, a client device 76 and an output device 74 may have incompatible cables, connectors, or signal formats, and these issues may remain undetected until the client device and output device fail to work properly together during the meeting, forcing participants to wait while the presenter and/or staff try to troubleshoot the problem. The increased diversity of portable devices 76 increases the risk of technical difficulty using output devices during meetings. The increased complexity of meetings held in multiple locations also increases risk of technical difficulty.

A meeting client device, indicated generally as 76, may be a network-enabled computer or other device present at meeting 72. Examples of client devices 76 include personal computers, laptop computers, personal digital assistants, tablet devices, touch-screen devices, touch-pad devices, smart phones, cellular telephones, and so on. Each meeting location may have multiple client devices, indicated as 76A-N at location 72A and as 176A-N at location 72N. Some devices 76 may be present at meeting 72 only at particular times. For example, a portable device 76 brought by an attendee may be present only during a particular event. A presenter may bring a private laptop computer to a meeting, for instance, and directly or indirectly connect it to an output device 74 such as a digital projector, allowing the laptop to display a presentation to attendees via the projector.

Network 82 may be a computer network provided in location 72A, 72N for the benefit of participants. Network 82 may be hardwired, wireless, or both. Each client device 76 and output device 74 accordingly may establish a connection to network 82, for example, to share data with other connected devices and/or to obtain data from external sources such as the Internet. For example, meeting 72 may offer a Wi-Fi network to allow participants to access local or remote services from client devices 76. Email service 92 is one of many services that may be provided via network 82. An output device 74 may connect to network 82 to obtain data during a meeting. For example, if a client device 76 such as a presenter's laptop computer and an output device 74 such as a digital projector are both connected to network 82, then the client device 76 (e.g., 76A, 78B, 176A, 176B, 176N) or external device 90 may send data such as a slideshow presentation to output device 74 via network 82.

Network 82 may enforce access controls such as a permissions system on any device connected to it. For example, network 82 may be configured to require an output device 74 to issue a credential, such as a user-identifier (user ID) and a corresponding password, before network 82 allows device 74 to establish a connection. For example, network 82 may require each client device 76A-N, 176A-N to issue a valid user ID/password pair or other credentials before network 82 allows the device to connect. Such credentials may be issued to particular attendees for particular meeting events, may differ from credentials used by the same attendees in other networked contexts, and may differ at each meeting event.

An external client device 90 may be a computer or similar device connected to network 82 independently of meeting 72. Examples of external devices 90 include personal or laptop computers, personal digital assistants, tablet, touch-screen, or touch-pad devices, smart phones, cellular telephones, and so on. A device 90 may reside on network 82 before, during, and/or after meeting 72. If device 90 is present on the network 82 before the start of meeting 72, then device 90 may be in communication with computer system 80, conferencing system 78, or both before the start of meeting 72. An external client 90 may become a meeting client 76. For example, an attendee may connect a portable device to an external network before a meeting, disconnect it, bring it to the meeting, and reconnect it via a connection offered at the meeting location. This new connection may require credentials that may differ from those used elsewhere on the network.

An email service or system 92 may be any suitable electronic message-passing system including not only e-mail but also text messaging, instant messaging, pager messaging, RSS feeds, announcements on Twitter and other social media, and so on. Email system 92 may enable any compatible device connected to a shared network 82 to send and/or receive messages to/from any other compatible device connected to the network. A compatible device may be an email client, for example, configured to allow a human user to write, send, and read messages; or it may be an automated device configured to generate and send messages and/or configured to receive and interpret messages. System 92 accordingly may be configured to assign one or more email accounts to one or more automated or robotic devices, so that each device may exchange messages with other human or automated accounts. An email account may sometimes be referred to as an email address.

An email system 92 may offer features to support meetings. For example, an email system may offer message formats that function as invitations, that allow each recipient to accept or decline an invitation, and that integrate with calendar and reminder systems.

An email system 92 may be customizable. For example, system 92 may provide features or tools that allow users, administrators, or programmers to add functionality to system 92. For example, system 92 may allow an administrator to add a user-interface feature to an email client or email message such as a new button that triggers a predefined message sent to a predefined account. If email system 92 is available in source-code form, it can be programmed to offer custom behavior of almost any sort, for example to add mechanisms for sending commands to devices via messages addressed to those devices. For example, the source code may be modified to offer native support for meeting invitations and/or device invitations that provide features for selecting or indicating devices for use during meetings.

Conferencing system 78 may be an example of a computer system/server 12 adapted to support online meetings. For example, a system 78 may control access by particular attendees to particular meetings, for instance, by issuing (and/or receiving) a password and user ID to (from) each attendee and limiting access to those entering valid credentials. A system 78 may transmit information to attendees. A system 78 may define a data-storage area, accessible by attendees via network 82, to support a meeting 72. Access to a meeting and/or data may take the form of assigning a uniform resource locator (URL) to a particular meeting and generating documents, for example formatted in HTML or other markup languages, that link to or otherwise indicate files and other data. Attendees may display the documents, for example in a web browser, as a means of accessing shared files and/or data. A system 78 may provide facilities for streaming or broadcasting audio and/or video to output devices 74 associated with a meeting 72. The user IDs, passwords, URLs, documents, files, and data associated with a particular meeting may be ephemeral products created before the start of the meeting.

Computer system 80, also referred to as scheduler 80, may be adapted to manage access to output devices 74 and other resources for meetings. Scheduler 80 may provide features that implement a registration system to reserve access to one or more locations 72A-N and/or to one or more associated output devices 74A-N. Scheduler 80 may provide features that allow administrators, invitees, attendees, or other persons or devices to request a reservation for the use of a location 72, output devices 74, or both, for a particular meeting defined by a date and time period (an interval defined by either start time and end time or start time and duration). Scheduler 80 may implement rules that determine the availability of requested devices and/or locations, and if a device is available (that is, if there is no conflicting prior reservation), create a new reservation. Scheduler 80 may transmit meeting-related data to output devices 74 and/or client devices 76. This data may include activation information (e.g., power-up and shut-down dates and times) and/or login information such as credentials (e.g., user IDs, passwords, and URLs). At a designated date and time, the reserved output devices may power up and connect to the specified meeting, for example by logging on with a password and user ID at a URL associated with conferencing system 78. Scheduler 80 may coordinate the use of output devices at multiple meeting locations, for example, by arranging for devices in different locations to display the same content at substantially the same time. Scheduler 80 may manage the process of switching a displayed signal from one data source to another data source, for example, for allowing a series of presenters, potentially in different locations, to show a series of presentations to attendees, potentially in different locations, that displays content substantially simultaneously on output devices (e.g., 74A and 174A) at the respective locations.

Architecturally, scheduler 80 or portions of scheduler 80 may reside anywhere in resource provisioning system 70. In an embodiment, all or part of scheduler 80 may be a distinct unit or element of system 70. For example, scheduler 80 may be implemented as a server computer system that offers shared or common mechanisms for reserving access to one or more output devices 74. In an embodiment, all or part of scheduler 80 may reside within another unit or element of system 70. For example, scheduler 80 and conferencing system 78 may be implemented together as subsystems of an integrated meeting system. For example, scheduler 80 may be implemented as a subsystem of an output device 74. A network-enabled projector, for instance, may contain hardware, software, or both that implements all or part of scheduler 80. For simplicity and clarity, FIG. 4 shows scheduler 80 and conferencing system 78 as separate units or elements of system 70. This logical abstraction separating the functional units might not or might not map to physical embodiments of scheduler 80.

Scheduler 80 may be connected to network 82 and thereby in communication with one or more external client devices 90, meeting client devices 76, output devices 74, conferencing systems 78, and/or other networked systems such as email service 92. Scheduler 80 accordingly may receive messages such as meeting invitations, output device invitations, or other data over network 82, for example in the form of email messages or invitations addressed to scheduler 80. Scheduler 80 may send messages to other devices, for example, to transmit credentials and other meeting-specific data to devices and resources such as output devices 74. Scheduler 80 may offer features to allow data entry by administrators or other users. For example, scheduler 80 may allow users to enter dates and time periods defining meetings; dates and times when an output device should activate; URL, credential, and password information for an output device to connect to a network 82 and/or conferencing system 78; and/or to identify files, e.g., that contain user-ID password pairs for use when issuing credentials.

Referring now also to FIG. 5 and FIG. 6, scheduler 80 may maintain a registry 100 indicating the availability status of one or more meeting locations 72A-N and/or the availability status 102 of one or more output devices 74. For each device 74 and/or location 72A, 72N, scheduler 80 may maintain a record of dates, times, and registration status as a means of tracking the availability of each device and/or location. Scheduler 80 may provide features that allow administrators or other users to define and maintain lists of locations 72A-N and associated output devices 74A-N and 174A-N, respectively. Scheduler 80 may provide features that allow administrators or other users to define and maintain particular meetings by location, devices, date, time period, an identifier such as a name, and other attributes.

FIG. 5 depicts an illustrative embodiment of resource provisioning system 70 with an emphasis on the flow of signals and/or messages within system 70. These communications may include one or more meeting invitations 104 and/or output device invitations 106 sent to, received by, and/or generated automatically by scheduler 80 (or packets 120 consolidating meeting invitations 104 and device invitations 106). These communications may further include activation information 108 and/or login information 110 sent by scheduler 80 to output device 74; may further include login information 110 sent by output device 74 to conferencing system 78; and may further include signals 112 and output content 114 sent by a meeting client device 76 and/or an external client device 90 to output device 74, possibly via conferencing system 78. All or some of this message-passing may occur over network 82 as shown in FIG. 5 (and omitted, for simplicity, from FIG. 6). An example of a signal that might occur outside network 82 is the signal 112 from client 76 to device 74, where the conductor might be a special-purpose video cable, for example.

A meeting invitation 104 may be a message or other data source that includes information that defines a meeting by indicating at least a date and time period. The information that defines a meeting may further include data indicating one or more locations 72A, 72N associated with the meeting. The information that defines a meeting may further include specifying other attributes such as an identifying name. In an embodiment, scheduler 80 may provide features such as a user interface to allow administrators or other users to enter or edit the date, time period, and other data defining a meeting.

In an embodiment, meeting invitation 104 may be a message sent by email system 92 to one or more email addresses. The source of invitation 104 may be an external client device 90 such as a networked laptop computer running email software. Email software may include predefined features provided to support meetings, for example, by defining a special type of message used for invitations, by tracking acceptance, and by sending reminders. Assigning an email address to scheduler 80 makes it possible to send an email invitation to scheduler 80, for example, by including its address on a list of addresses that receive the invitation. When scheduler 80 receives a meeting invitation, scheduler 80 may interpret the invitation as a reservation request and may extract data that defines a meeting from the invitation. For example, scheduler 80 may extract a date and time period (and, if applicable, location) by parsing the invitation for the data. The rules that extract the data may rely on nearby text such as headings, on distinctive metadata such as HTML or XML markup, string functions, or other techniques.

Scheduler 80 may interpret the extracted meeting data as a reservation request and check registry 100 for an indication of availability 102 (an indication of the presence or absence of a conflicting prior reservation). If scheduler 80 determines that registry 100 does not indicate a conflicting reservation, scheduler 80 may create a reservation for that date, time period, and (if applicable) location and may update the indication of availability in registry 100 to indicate the reservation. Scheduler 80 may indicate success, for example, by a confirmation message to one or more requesting and/or predetermined email addresses. If scheduler 80 detects a conflict, it does not create a second conflicting reservation, and may generate an informative message such as a reply to one or more requesting and/or predetermined email addresses.

A request for actual use of a device 74 during a meeting may trigger additional processing by scheduler 80. For example, scheduler 80 may generate and transmit messages to the reserved device 74 to prepare it for use during the meeting, to grant it access to data used during the meeting, or to provision it with credentials that grant it access to data used during the meeting. An output device invitation 106, in contrast to a meeting invitation 104, is a message or other data source that specifies one or more output devices and that serves as a request to reserve the devices for use during a meeting.

In an embodiment, a device invitation 106 may be a message sent to scheduler 80, which interprets the message as a request (or portion of a request) to reserve the use of the devices 74 and, if appropriate, to prepare the devices for use in the meeting. Device invitation 106 may be implemented by various means. For example, scheduler 80 may provide a means such as a user interface that allows administrators to enter or edit the data that indicates the requested devices. An administrator might perform this activity as a managerial function, not as an invitee or attendee of the meeting.

For another example, an email address assigned to output device 74 may serve as a means of communicating a device invitation 106 to scheduler 80. If an email invitation invites both scheduler 80 and device 74 to a meeting, for instance, then scheduler 80 may detect the address of the device among the recipients and interpret the presence of its email address as a device invitation 106—that is, as a request to reserve the device for use. The email account assigned to an output device may be configured to automatically forward meeting invitations 104 to scheduler 80, so that meeting invitations addressed to the device automatically pass to scheduler 80 for evaluation as device invitations 106. Any invitee or other person may then take advantage of an email invitation to request a reservation for the use of a device, for example, by forwarding a copy of an invitation to scheduler 80, device 74, or both.

For another example, a customized email system may provide a means of communicating a device invitation 106. An email system may provide mechanisms that allow an administrator to create custom features. For instance, an administrator may be able to add a set of check boxes, one for each available output device, to an invitation or to an invitation template. In an invitation containing the check boxes, selecting the corresponding check box may generate a message sent to scheduler 80, which may interpret the message as a device invitation 106. On receipt of a valid device invitation 106, scheduler 80 may update registry 100 to indicate the specified output device or devices are reserved for active use during the associated meeting.

To create a reservation for a device, scheduler 80 may require information specifying one or more particular meetings (for example, by date, time period, and if applicable location) and also require information specifying one or more devices being requested (for example, a name, label, or other identifier assigned to a particular projector). In an embodiment, scheduler 80 may receive the meeting and device information as distinct messages, potentially from distinct sources, and potentially at different times. In an embodiment, meeting invitation 104 may represent a distinct message specifying one or more particular meetings, while device invitation 106 may represent a distinct message specifying one or more particular devices. In an embodiment, device invitation 106 may include all the same information as in meeting invitation 104, and vice versa. The association linking the separate, corresponding meeting invitation 104 and device invitation 106 may occur by various means. If the device invitation is generated by a selection feature added to a standardized email invitation message, for example, then the association may be established by an identifier associated with the email invitation message and included or cross-referenced by the corresponding meeting and device invitations sent to scheduler 80. When receiving separate, corresponding meeting and device invitations, scheduler 80 may consolidate from the two invitations the data that uniquely identifies one or more meetings (by time and date) and devices (by identifier) and use the consolidated data to create one or more reservations for the requested devices.

In an embodiment, scheduler 80 may receive a single message that contains both meeting information and device information. This message, which may sometimes be called a packet of data 120, may combine the functionality of meeting invitation 104 and device invitation 106 into one communication. A packet 120, as shown in FIG. 6, accordingly transmits at least a date request 122, time request 124, and device request 126 in one message. Placing all the device-reservation data in one packet 120 may automatically establish the association between the requested meeting and device. A packet accordingly may contain enough information to request a reservation for one or more devices and may replace the separate meeting and device invitations.

On reserving an output device 74 for use during a meeting, scheduler 80 may send activation information 108 to the device. Activation information 108 may include a date and time period for the meeting and may further include instructions interpreted by the device as commands. For example, activation information 108 may include instructions to the device to power up before the meeting and/or shut down after the meeting. This automation simplifies the process of using the device during the meeting and helps assure that the device is ready for use when needed. Some devices may exhibit a warm-up and/or boot-up delay. Scheduler 80 may compensate for this delay by instructing the device to start up before the actual start of the meeting, so that the device is ready for use when needed. Adjustments to the activation time may also compensate for delays or latency during the login, connection, signal-acquisition, or other operations that prepare a device for use.

In an embodiment, scheduler 80 may instruct different output devices, say output devices 74A and 174A, to activate (e.g., power-up) at different predetermined times. For example, output device 74A may take longer to warm up than 174A, and therefore scheduler 80 may instruct that output device 74A power-up at an earlier time than output device 174A. In this way, all output devices may be ready to go for the meeting in an efficient way. Scheduler 80 may include a list associated with one or more output devices that indicates the optimal time needed to prepare each device for use. In this way, scheduler 80 may automatically generate the activation time instructions for one or more output devices based on this list.

On creating a reservation for an output device 74, scheduler 80 may send login information 110 to the device 74. Login information 110 may include a user ID 132 and a password 134 to be used by device 74 to obtain access to network 82 and/or conferencing system 78, for example, so that other networked devices or systems such as client devices 76 and/or conferencing system 78 can transmit files and/or signals to device 74. Login information 110 may further include a URL 136 specifying a web-accessible location associated with a meeting. For example, a conferencing system 78 may rely on a web-accessible location to transmit files, signals, or other information to device 74. Device 74 accordingly may use a specified combination of user ID 132, password 134, and URL 136 to gain access before or during the meeting to materials distributed by a password-protected website.

In some embodiments, login information 110 may include more than one user ID and more than one password, for example because network 82 and conferencing system 78 may require different user ID and password information.

As shown in FIG. 6, the data required to establish a connection during a meeting may be bundled together as a credential 130, which may include one or more user IDs 132, passwords 134, and URLs 136, and/or other site- or meeting-specific access or connection data. For example, credential 130 may include a password/user ID pair for access to a local network in addition to a password/user ID/URL triplet for access to a conferencing system 78 and material distributed by conferencing system 78. Each device 74A-N may be issued a corresponding credential 130A-N containing applicable login and/or connection data. Supplying credentials to devices sometimes may be referred to as "provisioning" the devices.

In an embodiment, the credential data may be issued or generated by scheduler 80 without reference to other systems. In an integrated device-reservation system, for example, scheduler 80 may natively administer the network- and device-access permissions on behalf of output devices 74 and may directly issue passwords and user IDs to the devices. In another embodiment, credential data may be issued by other systems. A resource provisioning system 70 that includes or cooperates with a third-party conferencing system, for example, may depend on credentials issued by the conferencing system. Scheduler 80 may obtain access to externally issued credentials by various means. For example, a human user may input credential values to scheduler 80 by data entry. For example, scheduler 80 may communicate with the credential-issuing system to obtain credential values by electronic message-passing. For example, scheduler 80 may be pre-loaded with predetermined credential values known to be valid to the external system. Any suitable means of transferring credentials from the credential-issuing system to scheduler 80 may allow scheduler 80 to relay valid credentials to output devices via login information 110.

At the start of the specified meeting, a reserved output device 74 may power up at a specified start time, may connect to network 82 via login information supplied by scheduler 72, and may connect to a web-enabled conferencing system 78 at a specified URL. Different devices reserved for use during the same meeting may power up at different times. A power-up time may precede the start of a meeting, for example, to compensate for a warm-up and/or boot-up delay. A power-up time may occur during a meeting, for instance, shortly before a particular presentation that depends on a particular device.

During the meeting, a signal 112 may be transmitted via network 82 to one or more devices 74. Signal 112 may be used as a carrier for output content 114. Examples of output content 114 may include slideshow presentations, live and/or prerecorded video and/or audio feeds, and so on. In an embodiment, the source of signal 112 may be a meeting client 76 (e.g., 76A, 78B, 176A, 176B, 176N) or an external client 90 connected to network 82, with signal 112 passing to conferencing system 78. A laptop computer running presentation software, for instance, may transmit a slideshow over a local network 82 for display to attendees via a projector.

In an embodiment, the source of signal 112 may be conferencing system 78, which may generate and transmit its own content via network 82 and/or relay content generated by one or more client devices 76 or 90. For example, a client device may pass content to a conferencing system 78 via network 82, and conferencing system 78 may then relay that content to one or more output devices 74.

In an embodiment, each device 74A-N may display a distinct signal 112A-N containing distinct content 114A-N.

In an embodiment, multiple devices 74A-N in the same location may display the same signal 112 and content 114. In meeting 72A, for instance, devices 74A and 74B may both connect to web-enabled conferencing system 78 that transmits same signal 112 and content 114 to both devices 74A and 74B. Both devices may display the content substantially simultaneously, for example, to provide attendees at meeting 72A with a choice of devices for viewing the content.

In an embodiment, multiple devices displaying the same content may be in different locations. For example, a first device 74A in a first location 72A may display the same content as a second device 174B in a second location 172N. Conferencing system 78 may, for example, transmit the same signal 112 and content 114 to devices at multiple locations of a meeting, for example, as a means of broadcasting content 114 to attendees in different locations. Allowing for propagation delays, the attendees may view the event substantially simultaneously.

In an embodiment, signal 112 may be switched from one source to another source. For example, during a first time period during a meeting, a conferencing system 78 may obtain or relay content 114 generated by particular client device, for example 76A, at a particular location. During a second, different time period during the meeting, the conferencing system may obtain or relay content 114 from a different client device, for example 76B (or external client 90), at the same location or at a different location. For a meeting held in two locations 72A and 72N, for instance, the conferencing system may transmit content generated by client device 76A at location 72A for one hour via signal 112 transmitted to devices 74A and 174A. At the end of the hour, the signal may be switched so that the conferencing system then afterward transmits content generated by client device 176B at location 72N via signal 112 transmitted to devices 74A and 174A. This switching provides a means for two or more presenters in the same location or in different locations to display content via shared reserved output devices. In an embodiment, the change in content source may trigger a change in output devices. Continuing the example, the second presentation generated by client device 176B may be transmitted to devices 74B and 174B instead of devices 74A and 174A. This switching generally provides a means of presenting a series of presentations in one or more meeting locations.

Figure 7:
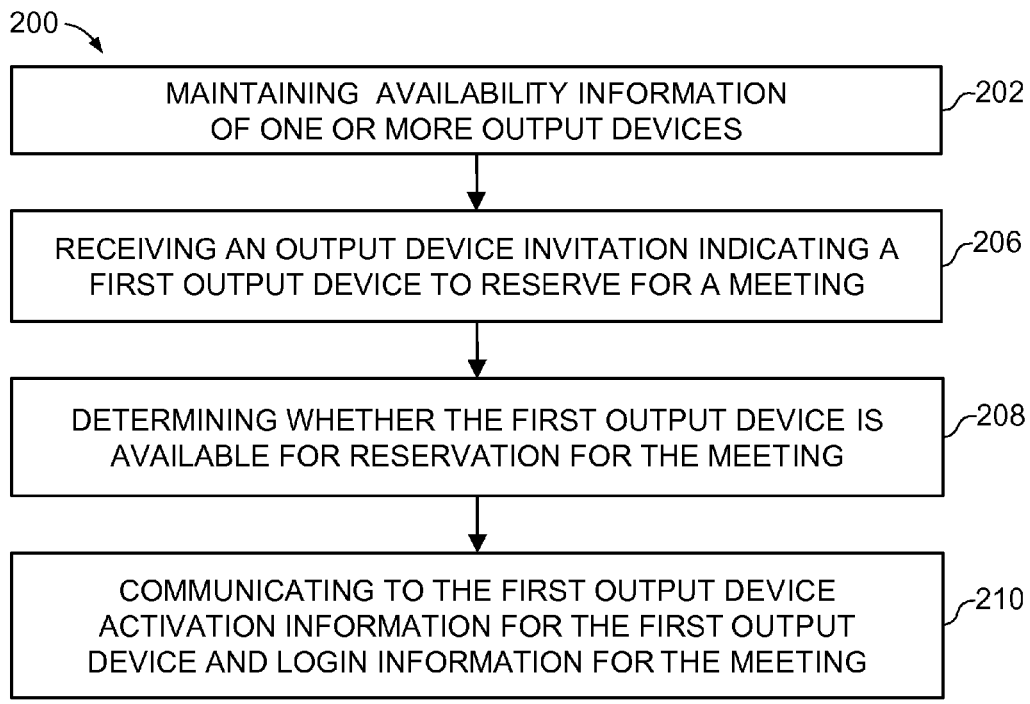
FIG. 7 depicts an exemplary method according to an embodiment of the present invention.

Referring now also to FIG. 7, a method 200 for reserving output devices and/or other resources for meetings may comprise maintaining 202 availability information of one or more output devices; receiving 206 an output device invitation indicating a first output device 74A to reserve for a meeting; determining 208 whether the first output device 74A is available for reservation for the meeting; and communicating 210 to the first output device 74A activation information for the first output device and login information for the meeting.

Maintaining 202 availability information may include keeping a list or registry 100 of output devices 74 and, for each device, an indication of availability 102, which may take the form of a date/time calendar for each device that records its reservation status through time. The calendar associated with a particular device accordingly maintains an indication of its availability at specified dates and time periods. If the calendar indicates that the device is not reserved for use at a specified date and time period, then the device is available for use, and scheduler 80 may permit the creation of a reservation for that device at that date and time period. On creating a reservation, scheduler 80 may update the indication of availability 102 to show that the corresponding device is unavailable. If the calendar indicates that the device is unavailable during a given date and time period, scheduler 80 may not permit the creation of a conflicting second reservation. A requested time period that overlaps with a reserved time period may be considered a conflicting request. In an embodiment, scheduler 80 may create a waiting list such that users on the waiting list will be notified if the resource becomes available that is unavailable for the requested time period (for example, if the original meeting becomes canceled or the resource is no longer needed for the requested time period).

In an embodiment, scheduler 80 may alternatively or additionally maintain a registry 100 of one or more meeting locations and/or one or more associated output devices. If the indication of availability for a given location shows that the location is available for use at a specified date and time period, then scheduler 80 may permit the creation of a reservation for that location. In an embodiment, a reservation for a location at a given date and time period may permit the creation of a reservation for one or more output devices associated with that location during the same date and time period, so that attendees of a meeting may reserve the use of one or more devices for use during a meeting. In an embodiment, creating a valid reservation for an output device may automatically create a reservation for its associated location. In other words, scheduler 80 may accept reservations for devices and cross-reference the associated locations or may accept reservations for locations and cross-reference the associated devices.

In an embodiment, scheduler 80 may receive a meeting invitation (such as through network 82), where the invitation includes at least a date request 122 and a time-period request 124 (defined by either start time/end time or by start time/duration) for the meeting. Scheduler 80 receiving the meeting invitation may further include extracting from the meeting invitation date- and time-request data describing one or more requested meetings, for example, to build a list of one or more requested dates and time periods. In an embodiment, a meeting invitation may additionally specify one or more locations for each meeting. Scheduler 80 may extract and store location-request data corresponding to date- and time-request data. In an embodiment, scheduler 80 may further include extracting and storing data from the meeting invitation that indicates its association with a device invitation.

Receiving 206 an output device invitation may include delivering by network 82 a device invitation 106 to scheduler 80, where invitation 106 indicates at least a first output device 74A. Receiving 206 may further include extracting and storing the device request 126A that indicates first device 74A from invitation 106. In an embodiment, receiving 206 may further include extracting and storing additional device indications, for example, to build a list of requested devices. In an embodiment, receiving 206 may further include extracting and storing data from the device invitation that indicates its association with a meeting invitation.

In an embodiment, receiving 206 may include receiving a packet of data 120 that may contain a date-request 122, a time-period request 124, and a device request 126. Packet 120 may be viewed as a single communication encompassing the data that defines a request to reserve a first device 74A at a specified meeting date and time period. Receiving 206 may further include extracting and storing the date-request 122, time-period request 124, and device request 126 from packet 120 for first device 74A.

Determining 208 whether the first output device is available for reservation for the meeting may include looking up in registry 100 the current indication of availability 102A for the specified device 74A at the specified date, time period, and (if applicable) location. If the indication of availability shows that the specified device, date, time period, and location are not already reserved, then determining 208 may further include creating a reservation for the specified device, date, time period, and location and updating the indication of availability to show the existence of a reservation. If the indication of availability shows that a reservation already exists, then determining 208 may further include generating an indication such as a message stating that a prior conflicting reservation prevented the creation of a new reservation.

Communicating 210 to the first output device activation information 108 for the first output device 74A and login information 110 for the meeting may include obtaining and/or generating activation data such as a power-up date and time, a shut-down date and time, and other commands to be interpreted by device 74A. Communicating 210 may further include generating a message encoding the activation information in a format interpretable by the specified device 74A and transmitting the activation information 108 to device 74A.

Communicating 210 may further include generating and/or obtaining login information 110, such as but not limited to any user IDs, passwords, and/or URLs, that device 74A may employ to connect to a local network and/or to a web-enabled conference during the specified meeting. Communicating 210 may further include transmitting login information 110 to first output device 74A.

Figure 8:
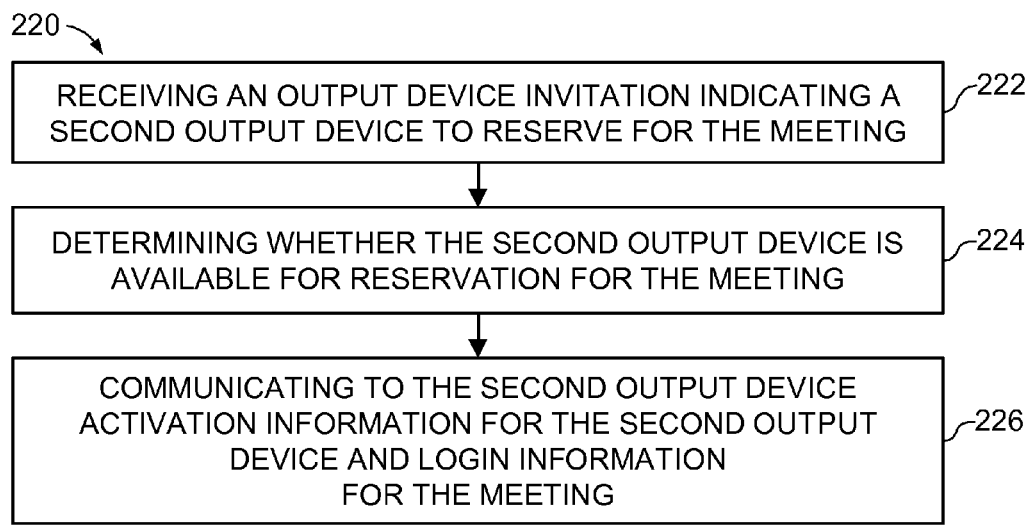
FIG. 8 depicts an exemplary method according to an embodiment of the present invention.

Referring now also to FIG. 8, a method 220 for reserving output devices and/or other resources for meetings may further comprise receiving 222 an output device invitation indicating a second output device, for example 74B or 174B, to reserve for a meeting; determining 224 whether the second output device 74B (or 174B) is available for reservation for the meeting; and communicating 226 to the second output device 74B (or 174B) activation information for the second output device and login information for the meeting.

Receiving 222 an output device invitation may include delivering by network 82 a device invitation 106 to scheduler 80, where invitation 106 indicates at least a second output device 74B (or 174B) to reserve. Receiving 206 may further include extracting and storing the device request that indicates second device 74B (or 174B) from invitation 106. Like receiving 206, receiving 222 may further include extracting and storing device requests indicating additional devices. Like receiving 206, receiving 222 may include receiving a packet of data 120 that may contain a date-request 122, a time-period request 124, and a device request 126 for second device 74B (or 174B) and extracting and storing requests 122, 124, and 126 from packet 120.

In an embodiment, a second computer/scheduler system may maintain availability dates and times for a resource, such as device 74B (or 174B). Computer system/scheduler 80 may be in communication with the second computer/scheduler system such that the availability information for both device 74A and 74B (or 174B) are synced between the systems. In this way, either scheduler 80 or the second computer system can be used to reserve 74A and 74B (or 174B).

Determining 224 whether the second output device 74B (or 174B) is available for reservation for the meeting may include looking up in registry 100 the current indication of availability 102 for the specified device 74B (or 174B) at the specified date, time period, and (if applicable) location. Further processing by determining 224 may be analogous to determining 208, except applied to second or subsequent device 74B (or 174B) instead of first device 74A.

Communicating 226 activation information to the second output device 74B (or 174B) for the second output device and login information for the meeting may include obtaining and/or generating activation data such as a power-up date and time, a shut-down date and time, and other commands to be interpreted by device 74B (or 174B). Additional processing by communicating 226 may be analogous to communicating 210, except applied to second or subsequent device 74B (or 174B) instead of first device 74A. For example, communicating login information 110 refers to obtaining and transmitting credentials applicable to second device 74B (or 174B).

Figure 9:
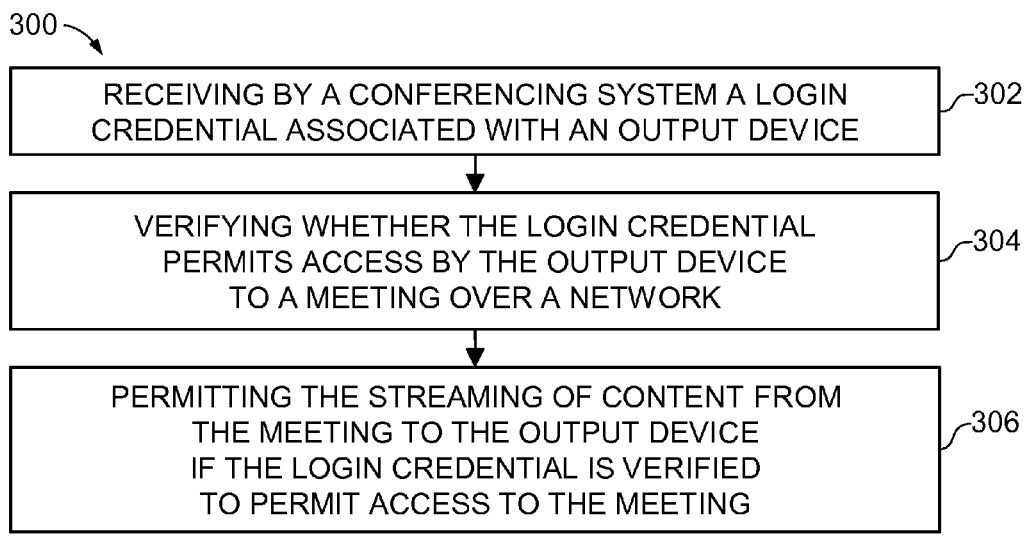
FIG. 9 depicts an exemplary method according to an embodiment of the present invention.

Referring now also to FIG. 9, a method 300 for reserving output devices and/or other resources for meetings may further comprise receiving 302 by a conferencing system 78 a login credential 130 associated with an output device 74; verifying 304 whether the login credential 130 permits access by the output device 74 to a meeting over a network; and permitting 306 the streaming of content from the meeting to the first output device if the login credential is verified to permit access to the meeting.

Receiving 302 by a conferencing system 78 a login credential 130A associated with a first output device 74A may include delivering by network 82 a credential 130A that may include one or more user IDs 132, passwords 134, and/or URLs 136. Receiving 302 may further include extracting and storing the credential data from the delivered message, for example, for use during verifying 304.

Credential 130A may have been transmitted to first device 74A by communicating 210. First device 74A may then retransmit all or part of credential 130A to conferencing system 78 via network 82, for example, as a means to join a password-protected meeting or obtain access to password-protected signals, files, or other data. This retransmission of all or part of credential 130A may be viewed as a login request by device 74A analogous to a login request by a human, for instance, by entering a user ID and password on a form submitted to a website to gain entry to the website. Because the credential data associated with a meeting may become invalid before and after the meeting, activation information 108 may directly or indirectly control the timing of the login attempt by first device 74A.

Receiving 302 may further include delivering a credential 130B assigned to a second or subsequent device 74B (or 174B) to conferencing system 78 via network 82. The processing of credential 130B may be equivalent to that of credential 130A, except that all steps refer to second or subsequent device 74B (or 174B) instead of first device 74A. Receiving 302 thus may apply to multiple devices 74 attempting to connect to a meeting. Receiving 302 may be viewed as the "target" of a login request sent by logging in 408.

Verifying 304 whether the login credential 130A permits access by the first output device 74A to a meeting over a network may include comparing login data such as a user ID 132A and password 134A extracted by receiving 302 to stored values, for example, by looking up the user ID/password pair in a database and testing the transmitted values for identity to the stored values. Password-access systems of this sort are known and may include comparing encrypted passwords rather than plain-text passwords. Verifying 304 may further include additional validation steps such as testing a received URL 136A, user ID 132A, and/or password 134A for validity at the time of receipt, for example, to block access to an expired meeting. If verifying 304 determines that the credentials are invalid, verifying 304 may deny the attempted login and may send an informational reply to device 74. If verifying 304 determines the credentials to be valid, verifying 304 may grant the login, send an informational reply to device 74, redirect to a new URL, and/or pass control to permitting 306.

Verifying 304 may further include verifying a second or subsequent credential 130B on behalf of a second or subsequent device 74B. The processing of credential 130B may be equivalent to that of credential 130A, except that all steps refer to second or subsequent device 74B (or 174B) instead of first device 74A. Verifying 304 thus may apply to multiple devices 74 attempting to connect to a meeting.

Permitting 306 the streaming of content 114 from the meeting to the first output device 74A may include granting access permissions to the meeting to device 74A if credential 130A is verified by verifying 304. Device 74A accordingly may join the meeting in the role of an output device. Permitting 306 may further include transmitting by conferencing system 78 a signal 112 containing content 114 to device 74A via network 82. Device 74A may then receive the signal 112, for example by receiving 410, and process the content 114 according to its capabilities. If device 74A is a projector, for example, then device 74A may display audio-video information transmitted by conferencing system 78 for viewing by attendees.

Permitting 306 may further include granting access to a meeting to a second or subsequent device 74B (or 174B). The processing for a second device 74B (or 174B) may be equivalent to that of first device 74A, except that all steps refer to second or subsequent device 74B instead of first device 74A. Permitting 306 thus may apply to multiple devices 74 connecting to a meeting.

Figure 10:
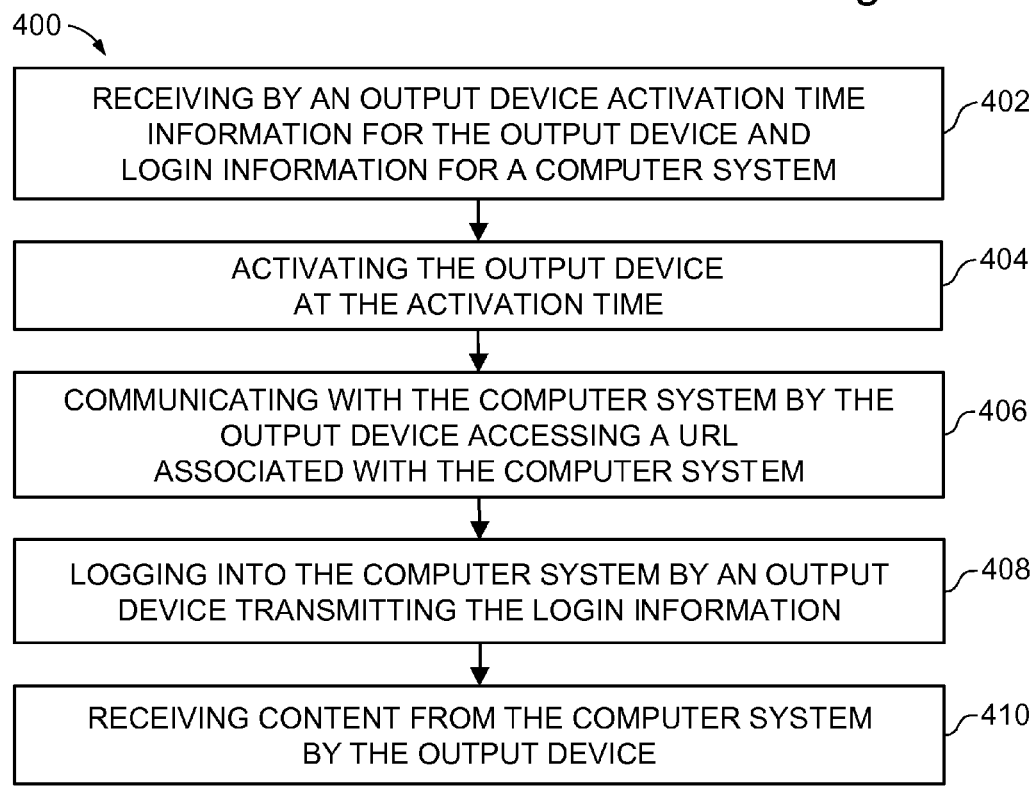
FIG. 10 depicts an exemplary method according to an embodiment of the present invention.

Referring now also to FIG. 10, a method 400 for reserving output devices and/or other resource for meetings may include receiving 402 by an output device 74 activation time information 108 for the output device 74 and login information 110 for a computer system (for example, scheduler 80 or conference system 78); activating 404 the output device 74 at the activation time; communicating 406 with the computer system by the output device 74 accessing a URL associated with the computer system; logging 408 into the computer system by an output device 74 transmitting the login information 110; and receiving 410 content 114 from the computer system by the output device 74.

Receiving 402 by an output device 74 activation time information 108 for the output device 74 and login information 110 for a computer system may include delivery by network 82 one or more signals or messages transmitted by scheduler 80 and addressed to device 74, where the signals convey meeting and/or connection data. Receiving 402 may further include extracting and storing activation data and/or login data from the received signals or messages. Receiving 402 activation information 108, for example, may include extracting and storing a power-up time, a shut-down time, and/or other control commands transmitted by scheduler 80 to device 74. Receiving login information may similarly include extracting and storing credential values such as a user ID 132, password 134, and URL 136. After receipt, device 74 may remain dormant until activated at an activation time.

Activating 404 the output device 74 at the activation time may include powering up device 74 at the designated date and time extracted from activation information 108 by receiving 402. The activation process may further include device-specific activation steps commanded by device-specific instructions transmitted with activation information 108. On successful activation, control may pass to communicating 406 or logging in 408.

Communicating 406 with the computer system by the output device 74 may include accessing by device 74 a website associated with the computer system via a URL extracted and stored by receiving 402. The process by which device 74 connects to a website may be similar to the process by which a human, running a web browser, connects to a website. For example, a URL may be resolved by DNS to an IP address that identifies a machine that hosts the website and that ultimately sends HTML or other data back to the requesting device or browser. For a URL associated with a password-protected system, for instance a password-protected conferencing system, the returned HTML may implement a login form or equivalent request seeking a user ID and password and blocking access prior to a valid login.

Logging into the computer system 408 may include transmitting by device 74 via network 82 login information 110 (or credentials 130), the transmission being addressed to conferencing system 78. In an embodiment, device 74 accordingly may obtain a user ID and password stored by receiving 402, prepare a message addressed to system 78 to transmit the values, send the message, and wait for a reply. In an embodiment, device 74 may supply login information 110 or credentials 130 by completing and submitting a website login form or equivalent request obtained from, for example, communicating 406. Logging in 408 may be viewed initiating the process of receiving 302 and verifying 304, which describe the transaction from the perspective of system 78. An unsuccessful login attempt may trigger an informational reply from system 78, error handling by scheduler 80, and/or a subsequent login attempt. A successful login attempt may trigger an informational reply and/or redirection to a password-protected location.

Receiving 410 content 114 may include delivery to device 74 by network 82 a signal 112 that may serve as a carrier for content 114, the signal 112 being transmitted by conferencing system 78. Receiving 410 may be viewed as a consequence of permitting 306 and the subsequent transmission of a signal to device 74 by system 78. On receipt of content 114, device 74 may process the content according to its capabilities. If device 74 is a projector, for instance, then the projector may display a slideshow presentation or other images to attendees. At a designated shut-down date and time, device 74 may power down and remain dormant until reactivated, for example, to serve as a resource at another meeting.

A software and/or hardware system that embodies or implements all or part of methods 200, 220, 300, and/or 400 may sometimes be referred to as a "records display program."

Methods 200, 220, 300, and/or 400 may include other, alternative, or additional elements; may omit one or more elements; and/or may follow a different sequence of elements from that listed.

As an example of an embodiment of the invention, scheduler 80 may receive a device invitation to reserve output devices 74A and 174A (e.g., projectors) for a meeting on a Friday at 2 pm. After confirming that output devices 74A and 174A are available for reservation, scheduler 80 may communicate an activation (e.g., power-up) time to output device 74A of 1:45 pm and to output device 174A of 1:50 pm. Scheduler 80 may also communicate credentials (same or different) to output devices 74A and 174A that include the URL of conferencing system 78 and a password and user name for logging into conferencing system 78 at a login time of 2 pm. Output devices 74A and 174A in turn power up at their respective activation times and log into conferencing system 78 using the credentials. Conferencing system 78 then may verify the credentials of output devices 74A and 174A. If verified, then conferencing system 78 may be joined to the meeting so that information (e.g., presentation slides or a video) can be transmitted from the conferencing system 78 to output devices 74A and 174A for substantially simultaneous output.

Continuing with the example, a first presenter and output device 74A could be located in one location (e.g., Colorado), a second presenter could be in a second remote location (e.g., North Carolina), and output device 174A could be in a third remote location (e.g., Europe). The first presenter may be scheduled to present during the meeting until 2:30 pm, and during that time can control transmitting the first presenter's slides for substantially simultaneous output on output devices 74A and 174A. Hence, all individuals viewing the output of devices 74A and 174A can be viewing the presentation of the first presenter. The second presenter could present during the meeting after 2:30 pm and gains control to transmit a video for substantially simultaneous output on output devices 74A and 174A. Output devices 74A and 174A could be powered-off at the conclusion of the meeting for example by conferencing system 78 and/or scheduler 80 transmitting de-activation information to devices 74A and 174A. In some embodiments, conferencing system 78 may transmit such information automatically at the conclusion of the meeting.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    maintaining by a computer system connected to a network an indication of availability dates and times of one or more output devices connected to the network,
    receiving by the computer system an output device invitation indicating a first output device to reserve for a meeting conducted over a conferencing system,
    determining by the computer system whether the first output device is available for reservation during a date and time period of the meeting,
    communicating by the computer system over the network to the first output device activation information, the activation information indicating a first predetermined date and time that the first output device is to become active before the meeting time period, the first predetermined period of date and time being adjusted according to a timing delay selected from the group consisting of a boot-up delay, a login delay, a connection delay, and a signal-acquisition delay, at a first predetermined date and time related to and login information including a first credential for the first output device to use for logging into the conferencing system for the meeting,
    enable and authorize by the conferencing system a first signal from a first computing device for signal output by the first output device at a start of a first portion of the meeting time period such that a first meeting attendee associated with the first computing device controls transmission of the first signal in real-time, wherein the first computing device was previously disabled and unauthorized by the conferencing system, and
    enable and authorize by the conferencing system a second signal from a second computing device for signal output by the first output device at a start of a second portion of the meeting time period such that a second meeting attendee associated with the second computing device controls transmission of the second signal in real-time, wherein the first computing device is disabled and unauthorized by the conferencing system, and wherein the second computing device was previously disabled and unauthorized by the conferencing system.

2. The method of claim 1, wherein the first output device is a projector and the method further comprises powering up the projector at the first predetermined date and time.

3. The method of claim 1, further comprising transmitting a signal from the conferencing system that includes output content from a location remote from the first output device for output on the first output device.

4. The method of claim 1, wherein communicating of the computer system over the network to the first output device the login information including the first credential includes communicating a user name and password for logging into the conferencing system and a uniform resource locator (URL) associated with the conferencing system, the conferencing system being web-based.

5. The method of claim 1, wherein receiving an output device invitation includes receiving on the network a packet of data that includes the output device invitation and the first credential.

6. The method of claim 1, further comprising:
    receiving by the conferencing system of the first credential,
    verifying by the conferencing system whether the first credential permits access to the meeting, and
    permitting by the conferencing system the streaming of content from the meeting to the first output device if the first credential is verified to permit access to the meeting.

7. The method of claim 1, further comprising generating automatically the first credential by the computer system.

8. The method of claim 1, further comprising indicating in the computer system that the first output device is reserved for the indicated date and time period if the first output device was available for reservation during the indicated date and time period.

9. The method of claim 1, further comprising:
    receiving by the computer system a second output device invitation indicating a second output device to reserve for the meeting,
    determining by the computer system whether the second output device is available for reservation during the date and time period of the meeting, and
    communicating by the computer system over the network to the second output device activation information indicating that the second output device is to become active at a second predetermined date and time related to the date and time period of the meeting and login information including a second credential for the second output device to use for logging into the conferencing system for the meeting.

10. The method of claim 9, wherein communicating over the network to the second output device activation information indicating a second predetermined date and time includes communicating over the network to the second output device activation information indicating a second predetermined time that is different than the first predetermined time.

11. The method of claim 9, further comprising transmitting from the conferencing system a first signal from one location for simultaneous output at a first viewing time period by the first output device at a first location and by the second output device at a second location remote from the first location.

12. The method of claim 11, further comprising transmitting from the conferencing system a second signal from another location that is remote from the one location for simultaneous output at a second viewing time period different from the first time period, by the first and second output devices.

13. The method of claim 12, further comprising switching by the conferencing system between the first and second signals.

14. The method of claim 9, further comprising maintaining a registry by the computer system that indicates any date and time periods during which the first and second output devices are reserved.

15. The method of claim 9, further comprising:
maintaining a registry by the computer system that indicates any date and time periods during which the first output device is reserved,
maintaining a registry by a second computer system, in communication with the first computer system, that indicates any date and time periods during which the second output device is reserved, and
syncing between the computer system and second computer system the availability information about the first and second output devices.

16. A method comprising:
receiving by an output device activation time information that includes an activation time for the output device, the activation time comprising a predetermined period of time that the output device is to power up before a meeting time period, the predetermined period of time being adjusted according to a timing delay selected from the group consisting of a boot-up delay, a login delay, a connection delay, and a signal-acquisition delay, and login information that includes a uniform resource locator (URL) and credential information for a web-enabled computer system networked to the output device and a login time,
activating the output device at the activation time by the output device automatically powering up at the activation time,
communicating with the computer system by the output device accessing the URL of the computer system, logging into the computer system by an output device transmitting the credential information to the computer system at the login time, and receiving content from the computer system by the output device,
enable and authorize by a conferencing system a first signal from a first computing device for signal output by the output device at a start of a first portion of the meeting time period such that a first meeting attendee associated with the first computing device controls transmission of the first signal in real-time, wherein the first computing device was previously disabled and unauthorized by the conferencing system, and
enable and authorize by the conferencing system a second signal from a second computing device for signal output by the output device at a start of a second portion of the meeting time period such that a second meeting attendee associated with the second computing device controls transmission of the second signal in real-time, wherein the first computing device is disabled and unauthorized by the conferencing system, and wherein the second computing device was previously disabled and unauthorized by the conferencing system.

17. The method of claim 16, wherein the output device is a projector.

18. The method of claim 16, wherein logging into the computer system by an output device using the credential information includes the output device automatically transmitting a login name and password, which are associated with the output device, for accessing the computer system.

* * * * *